(12) United States Patent
Prasad et al.

(10) Patent No.: US 9,710,463 B2
(45) Date of Patent: Jul. 18, 2017

(54) ACTIVE ERROR DETECTION AND RESOLUTION FOR LINGUISTIC TRANSLATION

(71) Applicant: Raytheon BBN Technologies Corp., Cambridge, MA (US)

(72) Inventors: Rohit Prasad, Acton, MA (US); Rohit Kumar, Belmont, MA (US); Sankaranarayanan Ananthakrishnan, Waltham, MA (US); Sanjika Hewavitharana, Waltham, MA (US); Matthew Roy, Arlington, MA (US); Frederick Choi, Cambridge, MA (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 126 days.

(21) Appl. No.: 14/099,079

(22) Filed: Dec. 6, 2013

(65) Prior Publication Data
US 2014/0297252 A1 Oct. 2, 2014

Related U.S. Application Data

(60) Provisional application No. 61/734,171, filed on Dec. 6, 2012.

(51) Int. Cl.
- *G06F 17/28* (2006.01)
- *G10L 15/01* (2013.01)
- *G10L 15/22* (2006.01)

(52) U.S. Cl.
CPC ............ *G06F 17/289* (2013.01); *G10L 15/01* (2013.01); *G10L 2015/225* (2013.01)

(58) Field of Classification Search
CPC ............... G06F 17/2872; G06F 17/289; G06F 17/2785; G06F 17/2881; G06F 17/2755;
(Continued)

(56) References Cited

U.S. PATENT DOCUMENTS

| 4,641,264 A | * | 2/1987 | Nitta | ........................ | G06F 17/271 |
| | | | | | 434/157 |
| 4,706,212 A | * | 11/1987 | Toma | ..................... | G06F 17/271 |
| | | | | | 434/157 |

(Continued)

OTHER PUBLICATIONS

Dan Bohus, Alexander I. Rudnicky, Sorry, I Didn't Catch That!—Investigation of Non-understanding Errors and Recovery Strategies, ISCA Archive, 6th SIGdial Workshop on Discourse and Dialogue, Lisbon, Portugal, Sep. 2-3, 2005, 16 pages.

(Continued)

*Primary Examiner* — Michael Colucci
(74) *Attorney, Agent, or Firm* — Daly, Crowley, Mofford & Durkee, LLP (57) ABSTRACT

A two-way speech-to-speech (S2S) translation system actively detects a wide variety of common error types and resolves them through user-friendly dialog with the user(s). Examples include features including one or more of detecting out-of-vocabulary (OOV) named entities and terms, sensing ambiguities, homophones, idioms, ill-formed input, etc. and interactive strategies for recovering from such errors. In some examples, different error types are prioritized and systems implementing the approach can include an extensible architecture for implementing these decisions.

19 Claims, 3 Drawing Sheets

(58) Field of Classification Search
CPC ............ G06F 17/2827; G06F 17/2854; G10L 13/043; G10L 13/08; G10L 15/26; G10L 15/265
USPC .................................................. 704/2; 339/2
See application file for complete search history.

(56) References Cited

U.S. PATENT DOCUMENTS

| | | | | |
|---|---|---|---|---|
| 7,739,102 | B2* | 6/2010 | Bender | G06F 17/2785 704/2 |
| 8,195,447 | B2* | 6/2012 | Anismovich | G06F 17/2881 704/2 |
| 8,380,486 | B2* | 2/2013 | Soricut | G06F 17/289 704/2 |
| 8,423,350 | B1* | 4/2013 | Chandra | G06F 17/30613 435/5 |
| 8,548,795 | B2* | 10/2013 | Anisimovich | G06F 17/2755 704/2 |
| 8,548,796 | B2* | 10/2013 | Stymne | G06F 17/2755 704/2 |
| 8,655,644 | B2* | 2/2014 | Kanevsky | G06Q 20/102 704/3 |
| 8,990,064 | B2* | 3/2015 | Marcu | G06F 17/289 704/10 |
| 2001/0029455 | A1* | 10/2001 | Chin | G06F 17/273 704/277 |
| 2004/0267527 | A1* | 12/2004 | Creamer | G10L 15/26 704/235 |
| 2005/0197827 | A1* | 9/2005 | Ross | G06F 17/30985 704/2 |
| 2005/0222838 | A1* | 10/2005 | Gong | G06F 17/2223 704/5 |
| 2006/0265209 | A1* | 11/2006 | Bradford | G06F 17/2809 704/9 |
| 2007/0219776 | A1* | 9/2007 | Gamon | G06F 17/27 704/9 |
| 2007/0282592 | A1* | 12/2007 | Huang | G06F 17/2775 704/9 |
| 2008/0091407 | A1 | 4/2008 | Furihata et al. | |
| 2009/0204386 | A1 | 8/2009 | Seligman et al. | |
| 2010/0030553 | A1* | 2/2010 | Ball | G06F 17/2715 704/9 |
| 2011/0054900 | A1* | 3/2011 | Phillips | G10L 15/30 704/235 |
| 2011/0060583 | A1* | 3/2011 | Choi | G06F 17/2836 704/2 |
| 2011/0144974 | A1* | 6/2011 | Seo | G06F 17/2836 704/4 |
| 2011/0202334 | A1* | 8/2011 | Abir | G06F 17/2809 704/4 |
| 2011/0270603 | A1* | 11/2011 | Ovil | G06F 17/2705 704/9 |
| 2014/0156258 | A1* | 6/2014 | Suzuki | G06F 17/2836 704/3 |
| 2014/0303961 | A1* | 10/2014 | Leydon | G06F 17/28 704/2 |

OTHER PUBLICATIONS

Matthias Eck, Ian Lane, Ying Zhang, Alex Waibel, Jibbigo: Speech-to-Speech Translation on Mobile Devices, IEEE, 2010, pp. 165-166.

Satoshi Nakamura, Konstantin Markov, Hiromi Nakaiwa, Genichiro Kikui, Hisashi Kawai, Takatoshi Jitsuhiro, Jin-Song Zhang, Hirofumi Yamamoto, Eiichiro Sumita, Seiichi Yamamoto, The ATR Multilingual Speech-to-Speech Translation System, IEEE, 2006, pp. 365-376.

Mikio Nakano, Kotaro Funakoshi, Yuji Hasegawa, Hiroshi Tsujino, A Framework for Building Conversational Agents Based on a Multi-Expert Model, Honda Research Institute Japan Co., Ltd., 2008, pp. 88-91.

Rohit Prasad, Prem Natarjan, David Stallard, Shirin Saleem, Shankar Ananthakrishnan, Stavros Tsakalidis, Chia-Lin Kao, Fred Choi, Ralf Meermeier, Mark Rawls, Jacob Devlin, Kriste Krstovski, Aaron Challenner, BBN TransTalk: Robust multilingual two-way speech-to-speech translation for mobile platforms, SciVerse ScienceDirect, 2011, 17 pages.

David Stallard, Chia-Lin-Kao, Kristie Krstovski, Daben Liu, Prem Natarajan, Rohit Prasad, Shiring Saleem, Krishna Subramanian, Recent Iprovements and Performance Analysis of ASR and MT in A Speech-to-Speech Translation System, IEEE, 2008, pp. 4973-4976.

David Stallard, et al., The BBN TransTalk Speech-to-Speech Translation System, Raytheon BBN Technologies, 23 pages.

Bernhard Suhm, Brad Myers, Alex Waibel, Interactive Recovery from Speech Recognition Errors in Speech User Interfaces, Interactive Systems Laboratories, pp. 865-868.

Markku Turunen, Kaakko Hakulinen, Agent-based Error Handling in Spoken Dialogue Systems,. Department of Computer Information and Sciences University of Tampere, 2001, Finland, 4 pages.

Markku Turunen, Jaako Hakulinen, JASPIS[2]—An Architecture for Supporting Distributed Spoken Dialogues, Department of Computer Information and Sciences University of Tampere, Finland, 4 pages.

Wolfgang Wahlster, Verbmobile Translation of Face-to Face Dialogs, MT Summit IV, Jul. 20-22, 1993, Kobe, Japan, pp. 127-135.

Brian A. Weiss,Craig Schlenoff, Greg Sanders, Michelle P. Steves, Sherri Condon, Jonn Phillips, Dan Parvaz, Performance Evaluation of Speech Trandation System, National Institute of Standards and Technology, Gaitherburg, MD, Mitre Corporation, McLEan, VA, 8 pages.

Ayan et al.; "'Can You Give Me Another Word for Hyperbaric?': Improving Speech Translation Using Targeted Clarification Questions;" IEEE 2013 IEEE International Conference on Acoustics, Speech and Signai Processing; May 2013; pp. 8391-8395.

Huang et al: "ASR Normaiization for Machine Translation:" IEEE 2010 Second International Conference on Intelligent Human-Machine Systems and Cybernetics, vol. 2; Aug. 2010; pp. 91-94.

Prasad et al.; "Active Error Detection and Resoiution for Speech-to-Speech Translation;" IWSLT Speech, Language, and Multimedia Business Unit, Raytheon BBN Technologies; Dec. 6, 2012; pp. 150-157.

Seligman; "Interactive Real-time Translation via the Internet;" AAAI Technical Report SS-97-02; Feb. 1997; pp. 142-148.

Suhm et al.; "interactive Recovery from Speech Recognition Errors in Speech User Interfaces:" IEEE Fourth International Conference on Spoken Language Proceedings, vol. 2; Oct. 1996; pp. 865-868.

Zhou et al.; "A New Framework to Deal with OOV Words in SLT System;" International Journal of Advanced Intelligence, vol. 3, No. 2; Jul. 2011; pp. 289-285.

PCT International Search Report of the ISA dated Mar. 19, 2015; For Pat. App. No. PCT/US2013/073578; 5 pages.

* cited by examiner

ACTIVE ERROR DETECTION AND RESOLUTION FOR LINGUISTIC TRANSLATION

CROSS-REFERENCE TO RELATED APPLICATIONS

This application claims the benefit of U.S. Provisional Application No. 61/734,171 filed Dec. 6, 2012, the contents of which are incorporated herein by reference.

STATEMENT AS TO FEDERALLY SPONSORED RESEARCH

This invention was made with government support under contract HR0011-12-C-0014 awarded by the Defense Advanced Research Projects Agency (DARPA). The government has certain rights in the invention.

BACKGROUND

This invention relates to active error detection and resolution for interactive linguistic translation, and more particularly for speech-to-speech translation.

The bulk of research exploring speech-to-speech systems has focused on maximizing the performance of the constituent automatic speech recognition (ASR), machine translation (MT), and text-to-speech (TTS) components in order to improve the rate of success of cross-lingual information transfer. Comparatively little effort has been invested in the exploration of approaches that attempt to detect errors made by these components, and the interactive resolution of these errors with the goal of improving translation/concept transfer accuracy.

Previous work presented by Stallard et al., "Recent Improvements and Performance Analysis of ASR and MT in a Speech-To-Speech Translation System," Proc. ICASSP 2008, pp. 4973-4976, included a methodology for assessing the severity of various types of errors in BBN's English/Iraqi S2S system. These error types can be broadly categorized into: (1) out-of-vocabulary concepts; (2) sense ambiguities due to homographs, and (3) ASR errors caused by mispronunciations, homophones, etc. Several approaches, including implicit confirmation of ASR output with barge-in and back-translation, have been explored for preventing such errors from causing communication failures or stalling the conversation, for example, as described in U.S. Pat. No. 8,515,749, titled "Speech-to-Speech Translation".

However, previous approaches impose a burden of error detection, localization, and recovery on the user, requiring the user to infer the potential cause of the error and determine an alternate way to convey the same concept. This may require high-level technical knowledge of how S2S systems work, and can be impractical for the broad population of users.

SUMMARY

In one aspect, in general, a two-way speech-to-speech (S2S) translation system actively detects a wide variety of common error types and resolves them through user-friendly dialog with the user(s). Examples include one or more of detecting out-of-vocabulary (OOV) named entities and terms, sensing ambiguities, homophones, idioms, ill-formed input, etc. and interactive strategies for recovering from such errors. In some examples, different detected occurrences of errors are prioritized and systems implementing the approach can include an extensible architecture for implementing strategies that can be used to recover from the errors.

Another aspect, in general, relates to cross-lingual name transfer. In a speech-to-speech (i.e., speech-to-text-to-text-to-speech) translation system, in some cases a user may utter a word or phrase that cannot or should not be translated. One type of such word or phrase is a proper name for a person or entity, as in "My name is Mr. Brown" in which the word "Brown" should not be translated as the color "brown". During the speech input processing phase prior to translation, such words or phrases are detected by one or both of:
  Out-of-vocabulary detection during speech recognition
  Syntactic, semantic and/or discourse analysis of the speech recognition output
Based on the detection, the speech segment for the detected portion is extracted from the input utterance, and the used without speech recognition and text processing in forming the speech output in a direct transfer approach. In some examples, the voice quality of the transferred portion may be adjusted (e.g., in volume) to match the machine synthesis of the output.

Another aspect, in general, relates to active error correction and detection. In a speech-to-speech (i.e., speech-to-text-to-text-to-speech) translation system, in some cases a user may speak a word sequence for which a translation may be incorrect due to one or more of:
  Presence of out-of-vocabulary (e.g., proper name) words or phrases
  Ambiguity in word sense
  Presence of homophones
  Use of idioms
The system automatically detects the situation (i.e., by speech recognition and/or text processing), and prompts the user(s) to resolve the ambiguity (typically prior to translation or presentation of the spoken translation to the target listener). For example, upon detection of an idiom, the system solicits a confirmation that a literal translation is desired or a rephrasing of the input be provided for accurate translation of the communication intent.

Another aspect, in general, relates to language independent resolution of lexical ambiguity in machine translation. In a translation system, certain translation rules (e.g., phrase pairs) are associated with a particular semantic word sense of a word in the source language. A system trained on paired sentences without sense markings can yield incorrect translation of meaning. An example, "fair" may have three senses: 1. (n) carnival, 2. (adj) equitable, 3. (adj) pale, so translation of "fair man" may be ambiguous as to whether he is equitable or is pale. An approach to machine translation identifies ambiguity in a source sentence that may affect (or has a high likelihood of affecting) the meaning of the translated sentence and disambiguates the sentence based on other information, for instance, based on an interactive dialog with an operator of the translation system. In some examples, the basis for identification of word sense ambiguities uses a rule clustering approach in which rules that use a particular word that has multiple senses are clustered according to the word sense used in the rule. Rather than requiring all the training sentences or all rules to be labeled with the sense of each such word, a limited number of rules and/or sentences are labeled, and the rules are clustered (e.g., by a constrained k-means approach) according to their similarity. At runtime, a translation is first performed without consideration of word sense. If a word with multiple senses is identified in the source sentence, and multiple rules with different senses could be applied to that word in the context of the sentence, then a disambiguation phase is entered. An interactive disambiguating dialog with a user is an example of such a phase, although other sources of information (e.g., domain knowledge) could be applied. After the desired word sense is identified (or probability of each sense determined), the sentence is translated again taking into account the word sense information, for example, by excluding rules associated with different senses.

In another aspect, in general, a computer-implemented method for speech-to-speech translation comprises accepting first data representing a speech utterance in a first language. The utterance comprises a first sequence of words. Speech recognition is performed using the first data as input to determine a recognition output corresponding to the first sequence of words. At least some words recognition output are identified for further processing. The further processing includes at least one of (a) processing said words as out-of-vocabulary (OOV) and/or named entities and terms, (a) resolving ambiguities, homophones, idioms, or ill-formed input, and (c) interactive error recovery. A second data representation of a translation of the speech utterance into a second language is then formed according to the recognition output and further processing of the identified at least some words.

In another aspect, in general, a computer-implemented method is used for linguistic processing. A linguistic input comprising a sequence of words in a first language is received from a first user, and a first data representation of the linguistic input is determined. The first data representation is processed, using a computer-implemented analyzer, to identify at least part of the data representation as being potentially associated with an error of processing (e.g., recognition and/or translation) of the linguistic input. Further processing of the identified at least part of the first data representation is performed using a computer-implemented recovery strategy processor to form a modified data representation of the linguistic input. A machine translator is used to form a second data representation of the modified data representation, and the second data representation is then processed as representing the linguistic input.

Aspects can include one or more of the following features.

The first data representation comprises a text representation in the first language.

Processing the second data representation comprises determining a linguistic output comprising a sequence of words in a second language, and providing the linguistic output to a second user.

The method comprises speech-to-speech translation, and wherein the linguistic input comprises a first audio input including a speech utterance by the first user and the linguistic output comprises a synthesized second audio signal including speech output.

Determining the first data representation of the linguistic input comprises recognizing, using a speech to text module of the computer, the speech utterance in the first audio signal to form the first text representation, and wherein determining the linguistic output comprises using a text to speech module of the computer to form the second audio signal from the modified data representation.

Processing the first data representation to identify at least part of the data representation as being potentially associated with an error of recognition and/or translation of the linguistic input comprises identifying said part as at least one characteristic of (a) including out-of-vocabulary (OOV) words, (b) representing a named entity, (c) including a homophone, (d) having an ambiguous word sense, and (e) including an idiom in the first language.

Performing the further processing includes selecting and performing a recovery strategy according the identified characteristic.

Performing the recovery strategy includes soliciting and receiving input for the recovery strategy from a user. For example, the user from whom the input for the recovery strategy is solicited and received is the first user. In some examples, performing the recovery strategy includes soliciting and receiving input for the recovery strategy from one or both of the first user and a second user to whom a linguistic output based on the second data representation is presented.

Performing the recovery strategy includes identifying a part of the first data representation with a corresponding part of the linguistic input and wherein forming the data representing the linguistic output comprises forming said data to transfer the part of the linguistic input to a linguistic output without translation.

The method comprises a speech-to-speech translation system, and wherein the linguistic input comprises a first audio input signal including a speech utterance by the first user and the linguistic output comprises a synthesized second audio signal including speech output, and wherein the second audio signal further comprises a part of the audio input signal.

Performing the further processing includes performing a constrained linguistic translation of the linguistic input.

Performing the recovery strategy includes soliciting and receiving input for the recovery strategy from the first user for disambiguation of a homophone, ambiguous word sense, or an idiom in the first language.

In another aspect, in general, software stored on a non-transitory computer-readable medium comprising instructions for causing a computer processor to perform a linguistic processing as set forth above. In yet another aspect, a computer-implemented linguistic processor includes: an input configured to receiving first data representing a linguistic input comprising a sequence of words in a first language from a first user; an input processor configured determining a first data representation of the linguistic input; a computer-implemented analyzer configured to use the first data representation to identify at least part of the data representation as being potentially associated with an error of processing of the linguistic input; a computer-implemented recovery strategy processor configured to performing further processing of the identified as least part of the first data representation to form a modified data representation of the linguistic input; and a machine translator to configured to form a second data representation of the modified data representation.

An advantage of the approach is that higher accuracy, speed or efficiency of processing linguistic input can be achieved, which can yield more efficient communication of meaning or intent from a first user. In at least some examples, this communication of meaning or intent includes communication to a second user in a second language.

Other features and advantages of the invention are apparent from the following description, and from the claims.

DESCRIPTION

An example of a speech-to-speech translation system is described in U.S. Pat. No. 8,515,749, titled "Speech-to-Speech Translation", issued on Aug. 20, 2013 (which is incorporated herein by reference). One aspect of that system is its ability to solicit verification from a speaker providing input to the system, for example, to confirm correct speech recognition of that user's input. Any combination of the approaches described below can be used independently for such verification, or in additional to such verification, to identify possible ambiguities or errors in the processing of an utterance (which may or may not exhibit speech recognition errors) and if necessary or desirable to solicit input from the user providing input to the system in a dialog intended to address those possible ambiguities or errors. Generally, the system becomes an active participant in cross-lingual dialogs by detecting key causes of communication failures and recovering from them in a user-friendly manner. Such an active participation by the system will not only improves translation success, but also improves the user's perception of the system.

Figure 1:
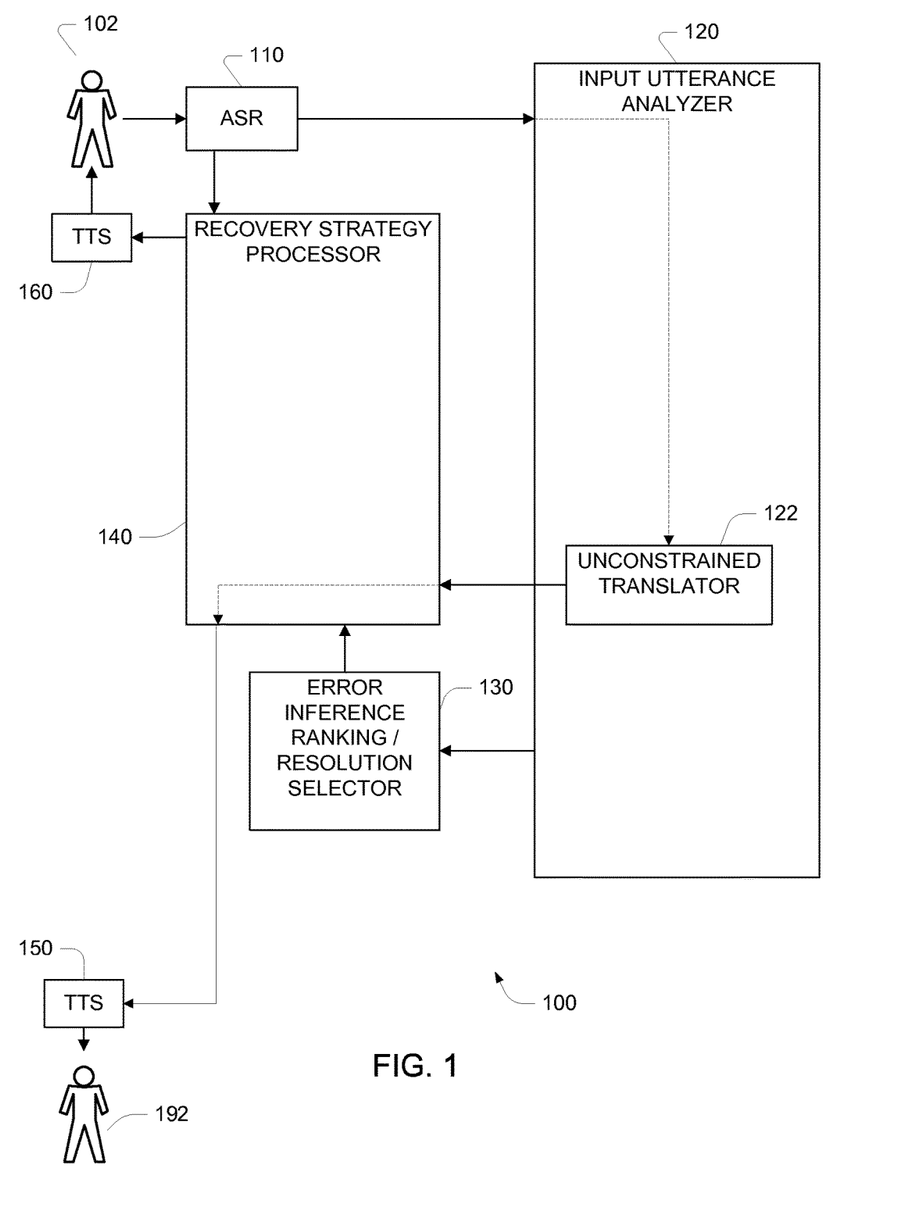
FIG. 1 is a block diagram of one direction of a speech-to-speech translation system with recovery processing.

Referring to FIG. 1, each direction of a speech-to-speech translation system 100 includes components for accepting spoken input from a first user 102, in one example spoken English, and providing spoken output to a second user 192, in this example in Arabic. Note that in general the system 100 is bidirectional also providing a path for accepting spoken input from the second user 192 for translation and presentation to the first user 102. However, for the sake of simplifying the figures and the discussion, the focus is on a single direction of translation and components for the communication path from the second user 192 to the first user 102 are not necessarily shown or discussed below.

The spoken input from the first user 102 is accepted (e.g., at a microphone, not shown) and processed by an automatic speech recognizer (ASR) 110. The output of the ASR 110 includes a text representation, for example, including a word-level transcription, phoneme level transcription, N-best transcription, lattice, graph and/or other text or symbolic form. The output of the ASR 110 is passed to an input utterance analyzer 120, which includes an unconstrained translator 122. This translator is "unconstrained" in the sense that it is not constrained by a recovery strategy as discussed below. In some cases, the output of the translator 122 is ultimately provided to a text-to-speech (TTS) system 150 without modification to output translated spoken output (i.e., an audio signal presented via a speaker) to the second user 192. More generally, the translation is provided to a recovery processor 140, which may refine the translation through automated processing and/or user-assisted processing in a dialog with the first user 102, for example, using a text-to-speech (TTS) system 160 and accepting input from the user by voice using the ASR 110. The recovery processor 140 is guided by results determined by the input utterance analysis 120, which are provided to an error inference ranking and resolution selector 130, which in turn determines whether and/or how likely various forms of errors are present in the input utterance, and selects resolution strategies according to which the recovery processor 140 is to process the input utterance.

Generally, the input analysis 120, error inference component 130 and recovery processing component 140 together provide functions including (1) automatically detecting potential error types, (2) localizing the error span(s) in spoken input, and (3) interactively resolving errors by engaging in a clarification dialog with the user.

The system 100 addresses one or more error types, which may include the following:

OOV-Name: A proper name spoken by the first users is outside the known speech recognition vocabulary of the ASR and is recognized as one or more phonetically similar words. For example, "My name is Sergeant Gonzales" is spoken and ASR output is "my name is sergeant guns all us".

OOV-Word: A word (i.e., not a proper name) is outside the known recognition vocabulary and is recognized as one or more phonetically similar words. For example, "The utility prices are extortionate" is spoken and ASR output is "the utility prices are extort unit".

Word Sense: Ambiguities in the input language can cause errors in translation if a target word/phrase does not correspond to the user's intended sense. For example "Does the town have enough tanks" has the ambiguity of whether the "tank" refers armored vehicles or storage units.

Homophone: Same sounding words may have different meanings. For example "Many souls are in need of repair" could have also been recognized with "soles" rather than "souls" with different meaning.

Mispronunication: Mispronunciations may cause similar sounding words with different meaning to be substituted. For example "How many people have been harmed by the water when they wash" may be recognized as "how many people have been harmed by the water when they worse" with "worse" having incorrectly been substituted for "wash".

Incomplete Utterance: Incomplete utterances may be produced if the speaker abruptly stops. e.g., if they release a Push-To-Talk (PTT) button. For example, an incomplete utterance is "Can you tell me what these".

Idiom: Idioms often produce erroneous literal translations due of the lack of appropriate transfer rules, for example, as in the utterance "We will go the whole nine yards to help."

As introduced above, the system includes an error inference component 130 that provides information regarding the presence of such errors, for example, by providing a score or a ranking characterizing the potential presence of each of the error types and a word or time span of such errors. This inference is based on the use of analysis performed on the input. The recovery processor 140 uses automated and/or user-mediated interventions to attempt recovery of the concepts present in the input utterance associated with an identified error span. At the end of a strategy, the second user 192 may be presented with a translation of the user's input utterance with appropriate corrections; or the first user 102 may be informed of the system's inability to translate the sentence, in some cases along with an explanation of the cause of this failure. With this information, the first user can choose to rephrase the input utterance so as to avoid the potential failure. At all times, the first user has the option to force the system to proceed with its current translation by issuing an appropriate command (e.g., "Go Ahead").

Continuing to refer to FIG. 1, in an embodiment of the approach, the Automated Speech Recognizer (ASR) 110 is based BBN Byblos ASR system. The system uses a multi-pass decoding strategy in which models of increasing complexity are used in successive passes in order to refine the recognition hypotheses. Details of this approach may be found in Nguyen et al., "Efficient 2-Pass N-Best Decoder," in *Proc. Eurospeech* 1997, pp. 167-170. In this embodiment, in addition to the 1-best and N-best hypotheses, the ASR 110 generates word lattices and confusion networks with word posterior probabilities. The latter are used as confidence scores for a variety of error detection components during input analysis and error resolution.

In one example, the acoustic model of the ASR 110 is trained on approximately 150 hours of transcribed English speech from the DARPA TRANSTAC corpus. The language model (LM) was trained on 5.8M English sentences (60M words), drawn from both in-domain and out-of-domain sources. LM and decoding parameters were tuned on a held-out development set of 3,534 utterances (45 k words).

In one example, the unconstrained translator 122 is a statistical machine translation (SMT) system that is trained using a corpus derived from the DARPA TRANSTAC English-Iraqi parallel two-way spoken dialogue collection. The parallel data (773 k sentence pairs, 7.3M words) span a variety of scenarios including force protection, medical diagnosis and aid, maintenance and infrastructure, etc.

In one example, phrase translation rules were extracted from bidirectional IBM Model 4 word alignment based on the heuristic approach described in Koehn et al. "Statistical Phrase-based Translation", *NAACL-HLT,* 2003, p. 48-54. The target LM was trained on Iraqi transcriptions from the parallel corpus and the log-linear model tuned with MERT (see Och, F. J., "Minimum Error Rate Training in Statistical Machine Translation", *Proc. of 41st ACL,* Stroudsburg, Pa., USA, 2003, pp. 160-167) on a held-out development set (~44.7 k words).

Figure 2:
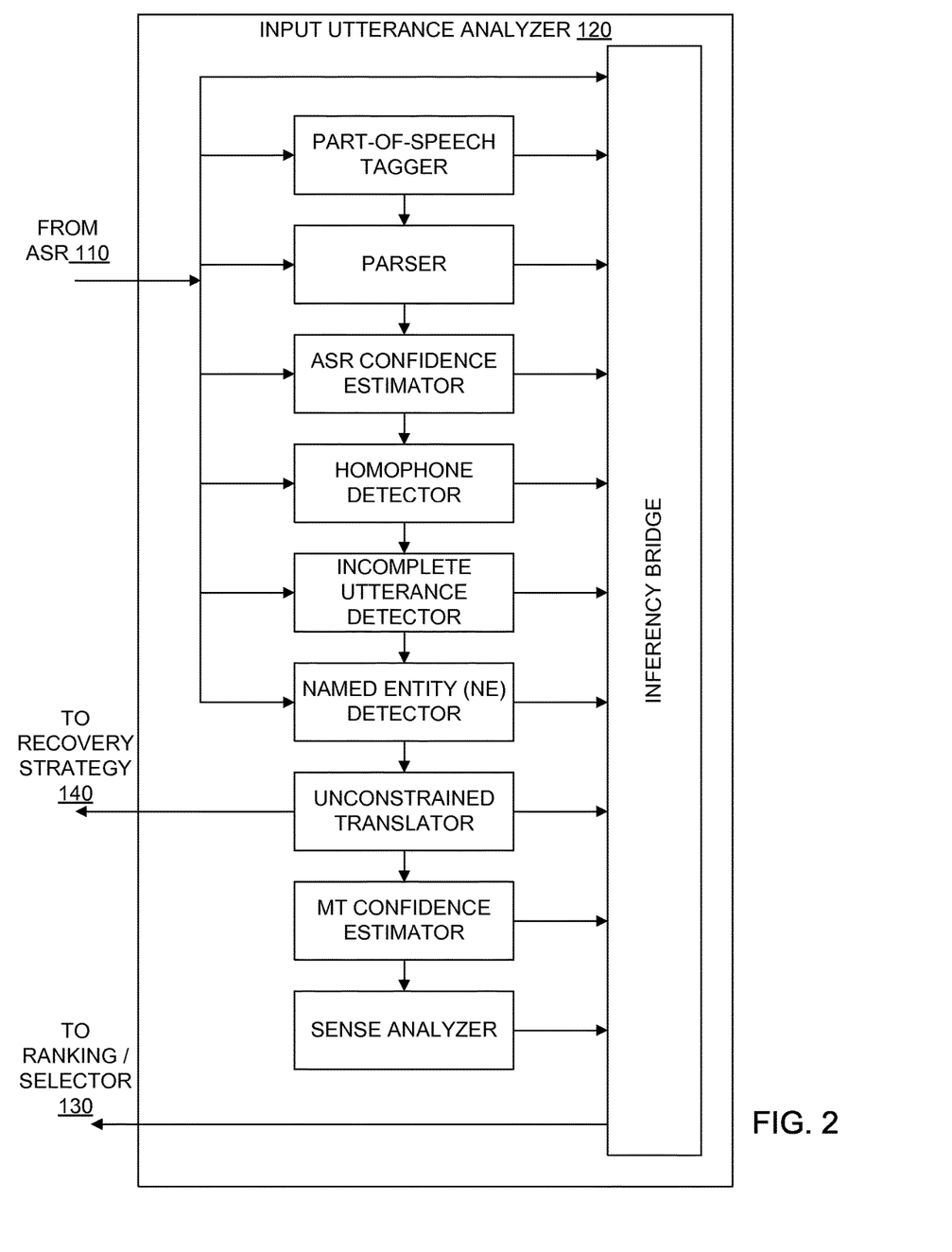
FIG. 2 is a block diagram of an input analyzer.

The input utterance analyzer 120 automatically detects segments of the input that it suspects correspond to potentially mistranslated output of the translator 122. Referring to FIG. 2, the analyzer 120 includes a number of separate components that are used in analyzing the ASR output.

In order to automatically detect mistranslated segments of the input, the input analyzer 120 include a confidence estimation system for SMT that learns to predict the probability of error for each hypothesized target word. In conjunction with SMT phrase derivations, these confidence scores are used to identify segments of the input test (i.e., the output of the ASR and/or corresponding time range of the input to the ASR) that may need to be clarified. The confidence estimator relies on a variety of feature classes:

SMT-derived features include forward and backward phrase translation probability, lexical smoothing probability, target language model probability, etc.

Bilingual indicator features capture word co-occurrences in the generating source phrase and the current target word and are obtained from SMT phrase derivations.

Source perplexity, which is positively correlated with translation error. We used the average source phrase perplexity as a feature in predicting probability of translation error.

Word posterior probability computed for each target word in the 1-best hypothesis based on weighted majority voting over SMT-generated N-best lists.

Reference labels for target words (correct vs. incorrect) were obtained through automated TER alignment on held-out partitions of the training set (10-fold jack-knifing). The mapping between above features and reference labels was learned with a maximum-entropy (MaxEnt) model. The approach exploited the "bursty" nature of SMT errors by using a joint lexicalized label (n-gram) LM to rescore confusion networks generated by the pointwise MaxEnt predictor.

Detecting out-of-vocabulary (OOV) names can be difficult because of the unreliable features resulting from tokens misrecognized by ASR in the context of an OOV word. A MaxEnt model is used to identify OOV named-entities (NE) in user input. The model uses lexical and syntactic features to compute the probability of each input word being a name. In one example, this model was trained on Gigaword, Wall Street Journal (WSJ), and TRANSTAC corpora consisting of approximately 250K utterances (4.8M words). This includes 450K occurrences of 35K unique named-entity tokens.

While the above detector is trained on clean text, in practice the translator input is "noisy" (i.e., is not necessarily accurate) due to ASR errors, for example, in the region of the OOV name. To address this mismatch, word posterior probabilities from ASR are used in two ways. First, an early fusion technique weighs each feature with the word posterior associated with the word from which the feature is derived. This attenuates unreliable features at runtime. Second, a heuristically-determined linear combination of ASR word posteriors and the MaxEnt named-entity posteriors are used to compute a score for each word. This technique helps in further differentiating OOV named-entity words since the ASR word posterior term serves as a strong OOV indicator.

Contiguous words with NE posteriors greater than a specified threshold are considered as a candidate span corresponding to an OOV name. Such spans are filtered through a list of known NEs. If a sizeable span (>0.33 seconds) contains at least one non-stopword unknown name token, it is considered for OOV name resolution.

In addition to detection of named entities, a heuristically derived linear combination of ASR and MT confidence for each input word in the source language is used to identify source words that are likely to result in poor translations. This error detector is used to identify a variety of errors including unknown/unseen translation phrases, OOV Word (non-names), user mispronunciations and ASR errors. All consecutive words (ignoring stop words) identified by this detector are concatenated into a single span.

Another factor that is addressed is that phrase-based SMT is susceptible to word sense translation errors because it constructs hypotheses based on translation rules with relatively limited context. We address this issue through a combination of (a) constrained SMT decoding driven by sense-specific phrase pair partitions obtained using a novel semi-supervised clustering mechanism, and (b) a supervised classifier-based word sense predictor.

A semi-supervised phrase-pair clustering approach is used to address word-sense disambiguation. Constraints for clustering phrase pairs associated with a given ambiguity class into their senses significantly are used to reduce clustering noise and "bleed" across senses due to lack of sufficient context in the phrase pairs. Constraints are obtained in three different ways.

1. Key-phrase constraints: Manually annotated key-phrases are used to establish an initial set of constraints between each pair of translation rules corresponding to a given ambiguity class. Two phrase pairs are related by a must-link constraint if their source phrases both contain key-phrases associated with the same sense label; or by a cannot-link constraint if they contain key-phrases corresponding to different sense labels.
2. Instance-based constraints: The word alignment of a sentence pair often allows extraction of multiple phrase pairs spanning the same ambiguous source word. All of these phrase pairs refer to the same sense of the ambiguous word and must be placed in the same partition. We enforce this by establishing must-link constraints between them.
3. Transitive closure: The process of transitive closure ensures that the initial set of constraints is propagated across all two-tuples of phrase pairs. This leads to a set of constraints that is far larger than the initial set, leading to well-formed, noise-free clusters. We implemented transitive closure as a modified version of the Floyd-Warshall algorithm. We used the transitive closure over key-phrase and instance-based constraints to partition phrase pairs for a given ambiguity class into their respective senses using constrained k-means.

Constrained decoding is a form of dynamic pruning of the hypothesis search space where the source phrase spans an ambiguous word. The decoder then chooses a translation from the partition corresponding to the intended sense. The partitioned inventories are used to tag each phrase pair in the SMT phrase table with its ambiguity class and sense identity.

At run time, the constrained SMT decoder expects each input word in the test sentence to be tagged with its ambiguity class and intended sense identity. Unambiguous words are tagged with a generic class and sense identity. When constructing the search graph over spans with ambiguous words tagged, we ensure that phrase pairs covering such spans match the input sense identity. Thus, the search space is constrained only in the regions of non-generic ambiguity classes, and unconstrained elsewhere. By naturally integrating word sense information within the translation model, we preserve the intended sense and generate fluent translations.

Complementary to the above framework is a supervised word sense disambiguation system that uses MaxEnt classification to predict the sense of an ambiguous word. Sense predictions by this component are integrated with user input in our mixed-initiative interactive system to identify the appropriate phrase pair partitions for constrained decoding.

Another common problem with ASR is the substitution of a different word that sounds identical to the spoken word (e.g. "role" vs. "roll"). To alleviate this problem, an automatic homophone detection and correction module based on MaxEnt classification is used. A set of homophone classes from the ASR lexicon is introduced such that the words in each class had identical phonetic pronunciation. For each homophone class, training examples containing the constituent words were identified. A separate classifier was trained for each homophone class with the correct variants as the target labels. This component essentially functions as a strong, local, discriminative language model. The features used for the homophone corrector are identical to those presented above for supervised word sense disambiguation.

Yet another problem that is address is that idioms unseen in SMT training usually generate incomprehensible literal translations. To detect and pre-empt translation errors originated from idioms, we harvested a large list of English idioms from public domain sources to use in a simple string matching front-end. However, the harvested idioms are usually in a single canonical form, e.g. "give him a piece of my mind". Thus, simple string match would not catch the idiom "give her a piece of my mind". We used two approaches to expand coverage of the idiom detector.

1. Rule-based idiom expansion: We created rules for pronoun expansion (e.g. "his"→"her", "their", etc.) and verb expansion (e.g. "give her a piece of my mind-"→"gave her a piece of my mind"), being conservative to avoid explosion and creation of nonsense variants.
2. Statistical idiom detector: We trained a binary MaxEnt classifier that predicts whether any input n-gram is an idiom. We used 3.2 k gold standard canonical idioms as positive samples and all 15M non-idiom n-grams in our data as negative samples. On a balanced set containing In order to detect user errors such as intentional aborts after mis-speaking, or unintentional pushing or releasing of the "record" button, we built an incomplete utterance detector (based on a MaxEnt classifier) that identifies fragments with ungrammatical structure in recognized transcriptions. Training data for incomplete utterances were automatically generated using an error simulator that randomly removed words from the beginning and/or end of a clean, fully-formed sentence. A number of lexical and syntactic features were used to train and evaluate the incomplete utterance classifier.

Figure 3:
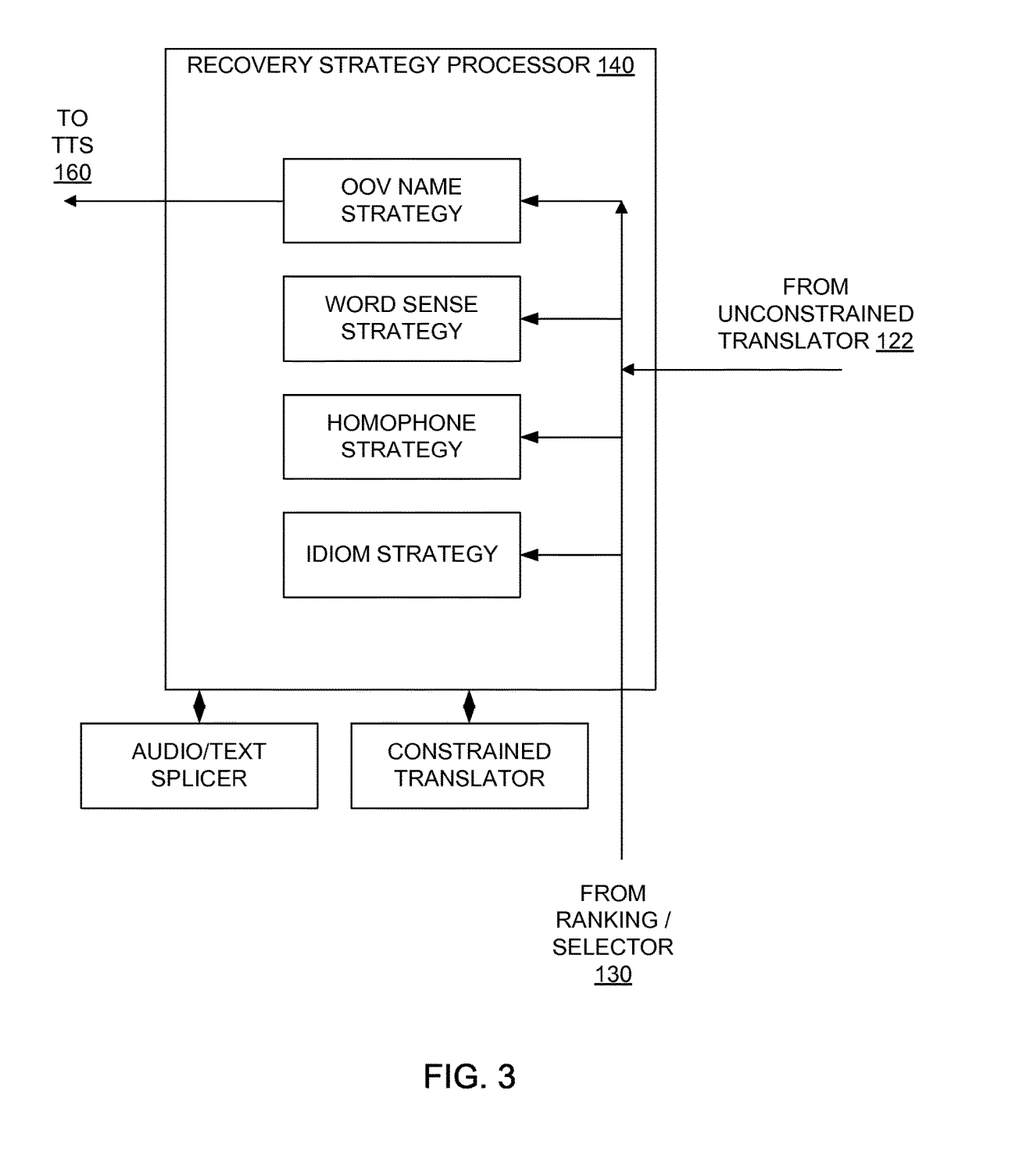
FIG. 3 is a block diagram of a recovery strategy processor.

Referring to FIG. 3, the error resolution strategies follows a multi-expert architecture. Each strategy was manually designed to resolve one or more types of errors discussed above. Each strategy is comprised of a sequence of steps which include actions such as TTS output, user input processing, translation (unconstrained or constrained) and other error type specific operations.

Several example excepts of scenarios are shown in the Appendix found at the end of the Description, and are referred to below.

The OOV Name and ASR Error strategies are designed to interactively resolve errors associated with OOV entities (names and non-names), and other ASR/MT errors. When a span of words is identified as an OOV named-entity, the user is asked to confirm whether the audio segment spanning those words actually corresponds to a name (see Appendix, Excerpt A), following which the segment is spliced in place of the target phrases (or alternatively synthesized in a voice compatible with the output text-to-speech system) corresponding to that span. In the case where a (non-name) error span is detected by the detector, the user is asked to rephrase the utterance. This strategy is suitable for handling multiple error types including OOVs, mispronunciations, and ASR/MT errors. Additionally, the ASR Errors strategy is designed to capture a large fraction of the OOV name false negatives (i.e. missed detections) by allowing the user to indicate if the error span is a name (Excerpt B). Because of the similar nature of the errors handled by these two strategies, it beneficial to maintain reciprocity between them to resolve all the errors handled by these strategies.

The Word Sense (WS) disambiguation strategy resolve sense ambiguity errors in translation. The underlying principle behind the strategy is that the sense of an ambiguous word must be confirmed by at least two of four possible independent sources. These four sources include (a) the translation system (sense lookup corresponding to phrase pair associated with the ambiguous word), (b) sense-inventory that lists source phrase keywords, (c) sense predicted by supervised model for sense-class and (d) sense specified by the user. Some of these sources may not be available for certain words. A Filtered sub-strategy corresponds to the case where (a) and (b) agree. In this case, the user is shown a message using the GUI and the system proceeds to present the translation to the Arabic speaker. Similarly, a Mismatch sub-strategy correspond to the case where (a) and (c) agree. If these three sources are unable to resolve the sense of the word, the user is asked to confirm the sense identified by source (a) following a Mismatch sub-strategy. If the user rejects that sense, a list of senses is presented to the user in a Backoff sub-strategy. The user-specified sense drives constrained decoding to obtain an accurate translation which is then presented to the second user. An example of this case is shown in Excerpt C of the Appendix.

Albeit simpler, the homophone (HP) resolution strategy mimics the WS strategy in principle and design. The observed homophone variant produced by the ASR must be confirmed either by the MaxEnt model (in the case of No Mismatch) of the corresponding homophone class or by the user (in the case of Mismatch) as shown in Excerpt D of the Appendix. The input utterance is modified (if needed) by substituting the resolved homophone variant in the ASR output which is then translated and presented to the second user.

Strategies for resolving errors associated with idioms and incomplete utterances (Excerpts E and F) primarily rely on informing the user about the detection of these errors. The user is expected to rephrase the utterance to avoid these errors. For idioms, the user is also given the choice to force a literal translation when appropriate.

At all times, the user has the ability to rephrase the initial utterance as well as to force the system to proceed with the current translation. This allows the user to override system false alarms whenever suitable. The interface also allows the user to repeat the last system message which is helpful for comprehension of long prompts presented by the system.

The description above focuses on strategies in which the first user provides the original utterance, and the first user may be engaged in a dialog with the system to resolve errors, ambiguities, etc. It should be understood that in alternative versions, the system may engage in a dialog with the second user, or with both the first user and the second user, either in sequence or concurrently, to address the errors and ambiguities. For example, when the system detects a possible ambiguity or error, it may solicit a confirmation from the second user that he understands the communication, while at the same time soliciting disambiguating input from the first user. The solicitation from the second user may be explicit (e.g., "do you understand") or may be implicit in that the second user can provide an input (e.g., pressing a "don't understand" button) on any utterance. In general, the dialog with one of the users may affect the dialog with the other user. For example, if the second user confirms that they understand, the system may terminate a clarification dialog with the first user.

The description above also focuses on a speech-to-speech translation system. It should be understood that aspects of the approach may be applied to other human input situations, which may not involve a second human user, may not involve speech input, and the machine translation may not involve translation into a second human communication language. As one example, first user may provide a spoken or typed or handwritten text input, which the system translates into a semantic representation, for example in a form of a data representation of meaning, or a parse tree, etc. The techniques described above may be used to detect errors, correct errors, and/or disambiguate portions of the first user's input to form the translation into the semantic representation. The dialog with the first user may be in the form of text or speech based dialog, or may take other forms of human-machine dialogs, for example, via a graphical user interface, camera input that processes gestures by the first user, etc. In some examples, the system may query a consumer of the translated representation, for example, a machine equivalent of the human "do you understand?" query. In some examples, the semantic representation is used for synthesizing machine translation of the first user's input, but it should be understood that that is only one or many possible uses of such a translation.

Implementations of the approaches described above can make use of software, which can be stored on a non-transitory computer-readable medium and include instructions for causing a data processing system (e.g., a general purpose computer processor) to perform the steps of the approaches described herein. Some implementations can include a self-contained, portable, speech-to-speech translation system with input (e.g., microphone) and output (e.g., speaker) components for acquiring an input utterance as audio and providing a translated utterance as audio, respectively. In other implementations, some or all of the processing described above may be performed at a server computer. For example, the audio may be acquired and presented at a personal device (e.g., a personal mobile device, a smartphone, etc.) with the input audio being passed to a server computer and the translated audio being passed back to the personal device. In other examples, other intermediate data may be passed between the personal device and the server computer. Aspects of the approaches described above may also be used outside the speech-to-speech translation domain. For example, detection of the named entities may be used in speech-to-text to replace an OOV name with a text form, for example, using a phonetic representation of synthesized spelling. Similarly, text-to-text or text-to-speech translation systems, or systems that can accept mixed text and speech input, can make use of the disambiguation strategies described above.

It is to be understood that the foregoing description is intended to illustrate and not to limit the scope of the invention, which is defined by the scope of the appended claims. Other embodiments are within the scope of the following claims.

APPENDIX

Examples of error recover strategies:

A. Out of Vocabulary Name

User Utt.: My name is Sergeant Gonzalez
ASR: my name is sergeant guns all us
Sys.: I heard "my name is sergeant guns all us". Is (audio: Sergeant Gonzalez) a name? Say Yes or Rephrase your sentence, or Go Ahead.
ASR: yes
Sys.: Translating "my name is (audio: Sergeant Gonzalez)".

B. OOVs and other ASR/MT error

User Utt.: Are your wages enough to subsist on?
ASR: are your wages enough to sub system
Sys.: I heard "are your wages enough to sub system". I am not sure about (audio: subsist). Please rephrase the sentence, say that's a name, or say Go Ahead.
User: do you make enough money
Sys.: Translating "do you make enough money"

C. Word Sense

User Utt.: I am looking for the man in charge.
ASR: i am looking for the man in charge
Sys.: I heard "i am looking for the man in charge". Charge is ambiguous. Say Option One for in command of, Option Two for payment, Option Three for accusation, or Rephrase your sentence.
User: option one
Sys.: Translating "i am looking for the man in charge" using charge as in command of.

D. Homophone

User Utt.: How much do you pay for the fare?
ASR: how much do you pay for the fair
Sys.: I heard "how much do you pay for the fair". I am unclear about fair. Say Option One for price of transportation, Option Two for free from bias, Or Rephrase your sentence
ASR: option one
Sys.: Translating "how much do you pay for the fare"

E. Improper Input/Fragment

User Utt.: I am going for the-
ASR: i am going for the
Sys.: I heard "i am going for the". This does not seem like a complete sentence. Say Go Ahead to translate or Rephrase your sentence.
ASR: i am going to the village
Sys.: Translating "i am going to the village"

F. Idiom

User Utt.: What can we do about this dead space here?
ASR: what can we do about this dead space here

APPENDIX-continued

Examples of error recover strategies:

Sys.: I heard "what can we do about this dead space here". Idioms like dead space may not be translated accurately. Say Go Ahead for literal translation, or Rephrase your sentence.
ASR: go ahead
Sys.: Translating "what can we do about this dead space here"

What is claimed is:

1. A computer-implemented method for linguistic processing for speech-to-speech translation, the method comprising:
receiving a linguistic input comprising a sequence of words in a first language from a first user, the linguistic input comprising a first audio input including a speech utterance by the first user;
determining a first data representation of the linguistic input;
processing, using a computer-implemented analyzer, the first data representation to identify at least part of the data representation as being potentially associated with an error of processing of the linguistic input, wherein the processing comprises identifying said part as at least one characteristic of (a) including out-of-vocabulary (OOV) words, (b) representing a named entity, (c) including a homophone, (d) having an ambiguous word sense, and (e) including an idiom in the first language;
performing further processing, using a computer-implemented recovery strategy processor, of the identified at least part of the first data representation to form a modified data representation of the linguistic input;
using a machine translator to form a second data representation of the modified data representation; and
processing the second data representation using the recovery strategy processor to refine the second data representation through at least one of automated processing or user-assisted processing;
determining a linguistic output from the refined second data representation, the linguistic output comprising a sequence of words in a second language; and
providing the linguistic output to a second user, the linguistic output comprising a synthesized second audio signal including speech output,
wherein identifying said part as including an idiom in the first language comprises performing rule-based idiom expansion and performing statistical idiom detection.

2. The method of claim 1 wherein the first data representation comprises a text representation in the first language.

3. The method of claim 1 wherein the method comprises speech-to-speech translation, and wherein the linguistic input comprises a first audio input including a speech utterance by the first user and the linguistic output comprises a synthesized second audio signal including speech output.

4. The method of claim 3 wherein determining the first data representation of the linguistic input comprises recognizing, using a speech to text module of the computer, the speech utterance in the first audio signal to form the first text representation, and wherein determining the linguistic output comprises using a text to speech module of the computer to form the second audio signal from the modified data representation.

5. The method of claim 1 wherein performing the further processing includes selecting and performing a recovery strategy according the identified characteristic.

6. The method of claim 5 wherein performing the recovery strategy includes soliciting and receiving input for the recovery strategy from a user.

7. The method of claim 6 wherein the user from whom the input for the recovery strategy is solicited and received is the first user.

8. The method of claim 6 wherein performing the recovery strategy includes soliciting and receiving input for the recovery strategy from one or both of the first user and a second user to whom a linguistic output based on the second data representation is presented.

9. The method of claim 5 wherein performing the recovery strategy includes identifying a part of the first data representation with a corresponding part of the linguistic input and wherein forming the data representing the linguistic output comprises forming said data to transfer the part of the linguistic input to a linguistic output without translation.

10. The method of claim 9 wherein the method comprises a speech-to-speech translation system, and wherein the linguistic input comprises a first audio input signal including a speech utterance by the first user and the linguistic output comprises a synthesized second audio signal including speech output, and wherein the second audio signal further comprises a part of the audio input signal.

11. The method of claim 1 wherein performing the further processing includes performing a constrained linguistic translation of the linguistic input.

12. The method of claim 5 wherein performing the recovery strategy includes soliciting and receiving input for the recovery strategy from the first user for disambiguation of a homophone, ambiguous word sense, or an idiom in the first language.

13. The method of claim 1, wherein processing the first data representation further comprises at least one of:
tagging one or more unambiguous words over a span of words within the first data representation;
tagging one or more ambiguous words over the span of words within the first data representation; and
predicting the one or more tagged ambiguous words based, at least in part, upon the one or more tagged unambiguous words.

14. The method of claim 13, wherein predicting the one or more tagged ambiguous words comprises one or more of: (i) determining a phrase pair associated with each of the one or more tagged ambiguous words; (ii) searching an inventory of source phrase keywords; (iii) determining a prediction based upon a supervised model; and (iv) receiving input from the first user.

15. The method of claim 1, wherein performing rule-based idiom expansion comprises performing rule-based idiom expansion comprising performing pronoun expansion and performing verb expansion.

16. The method of claim 1, wherein processing the first data representation further comprises identifying one or more incomplete utterances within the first data representation by identifying fragments with ungrammatical structure.

17. The method of claim 1, wherein the processing further comprises identifying said part as at least two characteristics of (a) including out-of-vocabulary (OOV) words, (b) representing a named entity, (c) including a homophone, (d) having an ambiguous word sense, and (e) including an idiom in the first language.

18. Software stored on a non-transitory computer-readable medium comprising instructions for causing a computer processor to perform a linguistic processing for speech-to-speech translation including:

receiving first data representing a linguistic input comprising a sequence of words in a first language from a first user, the linguistic input comprising a first audio input including a speech utterance by the first user;

determining a first data representation of the linguistic input;

processing, using a computer-implemented analyzer, the first data representation to identify at least part of the data representation as being potentially associated with an error of processing of the linguistic input;

performing further processing, using a computer-implemented recovery strategy processor, of the identified as least part of the first data representation to form a modified data representation of the linguistic input, wherein the processing comprises identifying said part as at least one characteristic of (a) including out-of-vocabulary (OOV) words, (b) representing a named entity, (c) including a homophone, (d) having an ambiguous word sense, and (e) including an idiom in the first language;

using a machine translator to form a second data representation of the modified data representation;

processing the second data representation using the recovery strategy processor to refine the second data representation through at least one of automated processing or user-assisted processing;

determining a linguistic output from the refined second data representation, the linguistic output comprising a sequence of words in a second language; and providing the linguistic output to a second user, the linguistic output comprising a synthesized second audio signal including speech output, wherein identifying said part as including an idiom in the first language comprises performing rule-based idiom expansion and performing statistical idiom detection.

19. A computer-implemented linguistic processing system for speech-to-speech translation, the system comprising:

an input configured to receiving first data representing a linguistic input comprising a sequence of words in a first language from a first user, the linguistic input comprising a first audio input including a speech utterance by the first user;

an input processor configured determining a first data representation of the linguistic input;

a computer-implemented analyzer configured to use the first data representation to identify at least part of the data representation as being potentially associated with an error of processing of the linguistic input;

a computer-implemented recovery strategy processor configured to performing further processing of the identified as least part of the first data representation to form a modified data representation of the linguistic input, wherein the processing comprises identifying said part as at least one characteristic of (a) including out-of-vocabulary (OOV) words, (b) representing a named entity, (c) including a homophone, (d) having an ambiguous word sense, and (e) including an idiom in the first language;

a machine translator to configured to form a second data representation of the modified data representation:

a computer-implemented recovery strategy processor configured to perform further processing of the identified as least part of the first data representation to form a modified data representation of the linguistic input and to refine the second data representation through at least one of automated processing or user-assisted processing; and a text-to speech system configured to determine linguistic output from the refined second data representation, the linguistic output comprising a sequence of words in a second language and providing the linguistic output to a second user, the linguistic output comprising a synthesized second audio signal including speech output, wherein identifying said part as including an idiom in the first language comprises at least one of performing rule-based idiom expansion and performing statistical idiom detection.

* * * * *